United States Patent Office 3,059,265
Patented Oct. 23, 1962

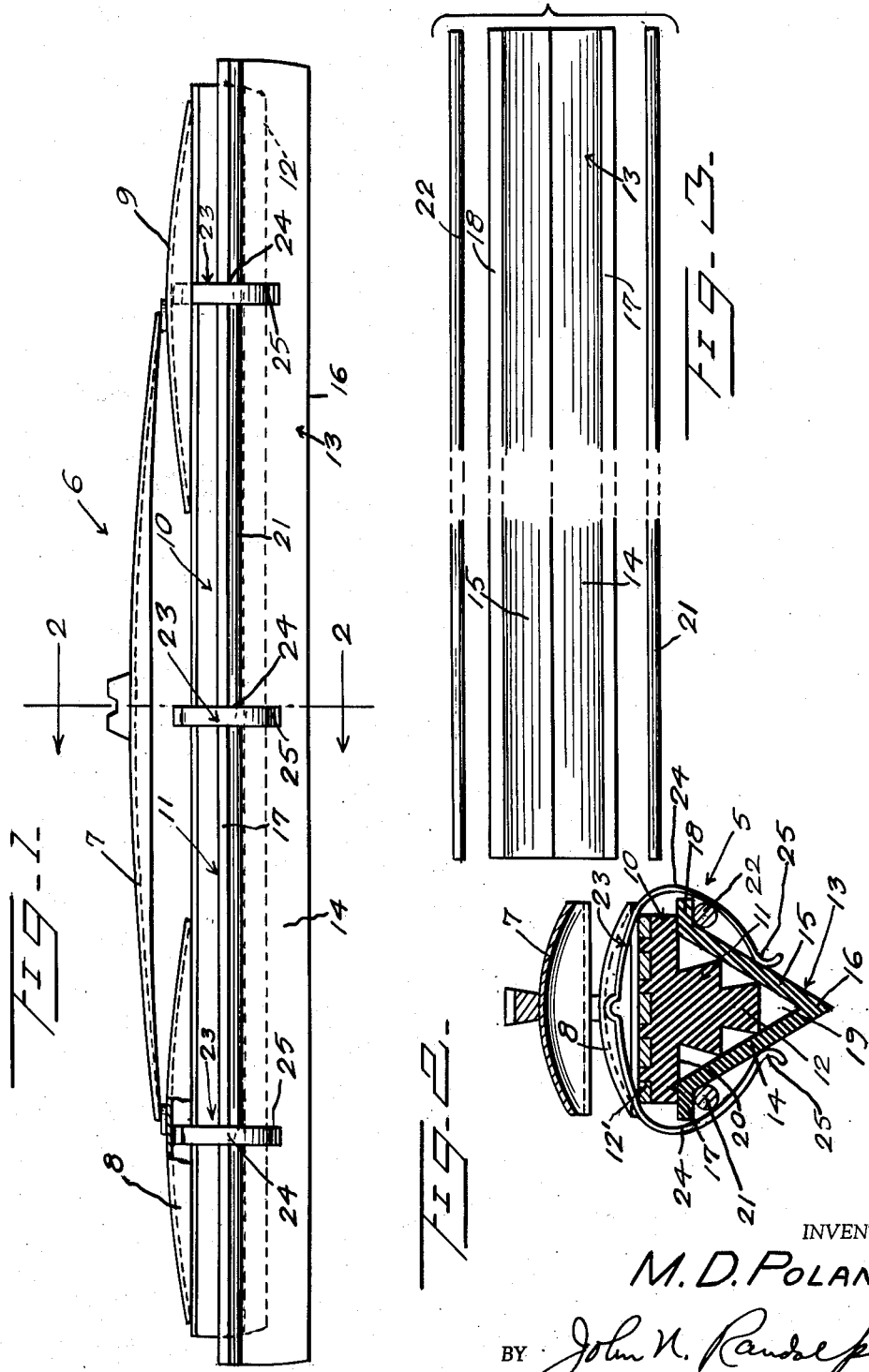

3,059,265
WINDSHIELD WIPER REPLACEMENT UNIT
Maurice D. Poland, 2272 NW. 90th St., Miami 47, Fla.
Filed June 16, 1961, Ser. No. 117,608
1 Claim. (Cl. 15—250.36)

This invention relates to a novel unit capable of being readily applied to a conventional motor vehicle windshield wiper blade to provide a replacement for the worn-out wiper element thereof.

More particularly, it is an object of the present invention to provide an inexpensive replacement unit which may be readily attached to a windshield wiper blade assembly so as to engage over the worn-out wiper element thereof and to function as a replacement therefor, at a much less expense than would be involved in replacing the complete wiper blade assembly.

Still another object of the invention is to provide a unit which may be readily applied to wiper blades of different lengths, which is capable of being economically manufactured, and which can be quickly and easily applied to a wiper blade assembly having a worn-out wiper element.

Various other objects and advantages of the invention will hereinafter become more fully apparent from the following description of the drawing, illustrating a presently preferred embodiment thereof, and wherein:

FIGURE 1 is a side elevational view, partly in section, showing a conventional windshield wiper blade assembly with the replacement unit applied thereto;

FIGURE 2 is an enlarged cross sectional view thereof, taken substantially along a plane as indicated by the line 2—2 of FIGURE 1, and FIGURE 3 is a fragmentary exploded plan view of parts of the replacement unit.

Referring more specifically to the drawing, for the purpose of illustrating the application and use of the replacement unit, designated generally 5 and comprising the invention, a conventional windshield wiper blade assembly is illustrated in FIGURES 1 and 2 and designated generally 6. Said wiper blade assembly 6 includes a main resilient bow member 7 having ends which are attached to the outer sides of intermediate portions of end bow members 8 and 9 which, in turn, are connected at their ends to the back portion 10 of a wiper element 11 of the assembly 6. The resilient bow members 7, 8 and 9 constitute a super structure of the wiper assembly. The back portion 10, which is wider in cross section than the remainder of the wiper element 11, as seen in FIGURE 2, may be provided with reinforcement elements 12' which are embedded in its back face and to which the ends of the end bows 8 and 9 are connected in a conventional manner; the wiper element 11 being otherwise formed of a resilient rubber capable of flexing readily and being urged to flex by the bow members 7, 8 and 9, to conformably engage the curved surface of a vehicle windshield over which the wiper element travels. The wiper element 11 includes a windshield engaging portion 12 which extends from end to end thereof and which is of a reduced width in cross section as compared to the back portion 10.

The replacement unit 5 includes an elongated wiper element 13 of V-shape in cross section, as seen in FIGURE 2, having corresponding downwardly converging side walls 14 and 15 which merge integrally with one another at their bottom edges to form an edge 16 of the wiper element 13. The side walls 14 and 15 at their opposite longitudinal edges terminate in outturned flanges 17 and 18, respectively. The parts 14 to 18 of the wiper element 13 each extends from end to end thereof. The wiper element 13 is formed of a resilient rubber and is preferably of a length slightly greater than the length of the wiper element 11. The wiper element 13 may be made originally in longer lengths and may be cut off to a proper length relative to the length of the wiper element 11 over which it is to be applied. The walls 14 and 15 combine to form a V-shaped channel 19 which extends from end to end of the wiper element 13 and in which the worn-out portion 12 of the element 11 is received, as seen in FIGURE 2.

As seen in FIGURE 2, the channel 19 is of a depth so that when the portion 12 of the wiper element 11 is disposed therein, portions of the flanges 17 and 18 will abut against the inner or underside 20 of the back portion 10 on opposite sides of said portion 12. The replacement unit 5 also includes two rods or strands 21 and 22 of spring steel which are of a length no greater than the replacement wiper element 13 when said element is applied, and which rods or strands bear against the undersides of the flanges 17 and 18, respectively, as seen in FIGURE 2.

The replacement unit 5 also includes a plurality of corresponding spring clips 23, each formed of a bowed strip of spring metal, each of which is passed around the back portion 10 of the wiper element 11. Each spring clip 23 has corresponding legs 24 which are bowed away from one another and which are sprung apart to engage around the flanges 17 and 18 and around the rods 21 and 22. The legs 24 partially embrace the wiper element 13 and have reversely bent terminal portions 25 which bear yieldably against portions of the outer sides of the walls 14 and 15 and which are spaced from the edge 16. Portions of the legs 24 also yieldably bear against the rods 21 and 22 for urging said rods upwardly and inwardly with respect to one another for maintaining the flanges 17 and 18 clamped tightly against the surface 20.

It will thus be seen that the element 13 of the replacement unit 5, when in an applied position as illustrated in FIGURES 1 and 2, constitutes a "recap" for the worn-out wiper element 11, to which it is secured. The edge 16 is disposed substantially below or beyond the portion 12 of the wiper unit 11 and beyond the terminal portions 25 of the clips 23, so that said edge and the portions of the walls 14 and 15, located adjacent thereto, can flex freely as the wiping edge 16 moves back and forth across a windshield surface, not shown, to be cleaned thereby, for effectively wiping and cleaning the surface by a squeegee-type action. Additionally, the replacement unit 13 is sufficiently flexible so that it will not interfere with flexing of the element 11 under the yielding pressures exerted by the bow members 7, 8 and 9, so that the elements 11 and 13 can flex to enable the edge 16 to conformably engage curved windshield surfaces over which said edge is moving.

Various modifications and changes are contemplated and may be resorted to, without departing from the function or scope of the invention as hereinafter defined by the appended claim.

I claim as my invention:
A replacement unit for a windshield wiper assembly comprising an elongated rubber strip of V-shaped cross section defining a channel in which a portion of a worn-out windshield wiper blade element is adapted to be received, said strip extending from end to end of the wiper element, spring clips adapted to engage around a back portion of the wiper element and having corresponding outwardly bowed spring legs partially embracing said V-shaped rubber strip for yieldably clamping said rubber strip to the wiper element, said V-shaped rubber strip having outturned flanges, and rods disposed between and in engagement with said flanges and portions of said spring legs for yieldably clamping said flanges against the back portion of the wiper element.

References Cited in the file of this patent

UNITED STATES PATENTS

| | | |
|---|---|---|
| 1,817,305 | French | Aug. 4, 1931 |
| 1,888,370 | Berdan | Nov. 22, 1932 |
| 2,926,375 | Flynn | Mar. 1, 1960 |